(12) United States Patent
Qi et al.

(10) Patent No.: US 11,729,034 B2
(45) Date of Patent: *Aug. 15, 2023

(54) METHOD AND APPARATUS FOR PERFORMING RANDOM ACCESS IN WIRELESS COMMUNICATION SYSTEM

(71) Applicant: Samsung Electronics Co., Ltd., Suwon-si (KR)

(72) Inventors: Yinan Qi, Staines (GB); Mythri Hunukumbure, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/862,165

(22) Filed: Jul. 11, 2022

(65) Prior Publication Data

US 2022/0353122 A1    Nov. 3, 2022

Related U.S. Application Data

(63) Continuation of application No. 17/054,759, filed as application No. PCT/KR2019/005654 on May 10, 2019, now Pat. No. 11,388,757.

(30) Foreign Application Priority Data

May 11, 2018    (GB) ..................... 1807680

(51) Int. Cl.
*H04B 7/185*    (2006.01)
*H04W 74/08*    (2009.01)
(Continued)

(52) U.S. Cl.
CPC ....... *H04L 27/2607* (2013.01); *H04B 7/1855* (2013.01); *H04J 13/0062* (2013.01);
(Continued)

(58) Field of Classification Search
CPC ............ H04L 27/2607; H04L 27/2613; H04L 27/26132; H04B 7/1855; H04B 7/18502;
(Continued)

(56) References Cited

U.S. PATENT DOCUMENTS 10,547,374 B1 *    1/2020    Liu ...................... H04W 72/14
2015/0146631 A1    5/2015    Kim et al.
(Continued)

FOREIGN PATENT DOCUMENTS

EP    3030018 A    6/2016

OTHER PUBLICATIONS

International Search Report and Written Opinion of the International Searching Authority in connection with International Application No. PCT/KR2019/005654 dated Aug. 22, 2019, 8 pages.
(Continued)

*Primary Examiner* — Jae Y Lee
*Assistant Examiner* — Aixa A Guadalupe Cruz

(57) ABSTRACT

Provided are methods and apparatuses for performing a random access of a terminal in a wireless communication system. A method, performed by a terminal, of performing a random access, according to an embodiment, includes receiving preamble configuration information from a base station, obtaining a RACH (random access channel) preamble scaled in length in proportion to a difference between an expected minimum distance and an expected maximum distance to the base station from opposed edges of a cell served by the base station, based on the preamble configuration information and transmitting the obtained RACH preamble to the base station to access a NTN (non-terrestrial network).

15 Claims, 4 Drawing Sheets

(51) Int. Cl.
*H04L 27/26* (2006.01)
*H04J 13/00* (2011.01)
*H04W 84/06* (2009.01)

(52) U.S. Cl.
CPC ..... *H04L 27/2613* (2013.01); *H04W 74/0833* (2013.01); *H04B 7/18502* (2013.01); *H04L 27/26132* (2021.01); *H04W 84/06* (2013.01)

(58) Field of Classification Search
CPC  H04B 7/185; H04J 13/0062; H04W 74/0833; H04W 84/06
See application file for complete search history.

(56) References Cited

U.S. PATENT DOCUMENTS

| | | | |
|---|---|---|---|
| 2017/0331670 | A1 | 11/2017 | Parkvall et al. |
| 2017/0367120 | A1 | 12/2017 | Murray et al. |
| 2017/0373731 | A1 | 12/2017 | Guo et al. |
| 2018/0098298 | A1* | 4/2018 | Jung ............ H04W 48/08 |
| 2020/0196263 | A1* | 6/2020 | Heyn ............ H04W 56/0005 |
| 2020/0221508 | A1* | 7/2020 | Huang ............ H04W 68/005 |
| 2020/0413451 | A1 | 12/2020 | Taherzadeh Boroujeni et al. |
| 2021/0029658 | A1 | 1/2021 | Mahalingam et al. |

OTHER PUBLICATIONS

3GPP TR 38.811V0.3.0 (Dec. 2017), Technical Report, 3rd Generation Partnership Project; Technical Specification Group Radio Access Network; Study on New Radio (NR) to support non terrestrial networks (Release 15), Dec. 2017, 56 pages.

Interdigital Inc., "Considerations on Random Access for Non-Terrestrial Networks," R1-1802632, 3GPP TSG RAN WG1 Meeting #92, Atehns, Greece, Feb. 26-Mar. 2, 2018, 4 pages.

Search Report, dated Oct. 30, 2018, in connection with GB Patent Application No. 1807680.2, 1 page.

Supplementary European Search Report dated May 11, 2021 in connection with European Application No. 19800197.6, 10 pages.

Nokia, et al., "Random access principles for New Radio," R1-167296, 3GPP TSG-RAN WG1 Meeting #86, Gothenburg, Sweden, Aug. 22-26, 2016, 4 pages.

Nokia, et al., "NR Physical Random Access Channel," R1-1708243, 3GPP TSG-RAN WG1#89, Hangzhou, China, May 15-19, 2017, 37 pages.

European Patent Office, "Communication pursuant to Article 94(3) EPC," dated Mar. 31, 2023, in connection with European Patent Application No. 19 800 197.6, 5 pages.

* cited by examiner

METHOD AND APPARATUS FOR PERFORMING RANDOM ACCESS IN WIRELESS COMMUNICATION SYSTEM

CROSS-REFERENCE TO RELATED APPLICATIONS

This application is a continuation of application Ser. No. 17/054,759, now U.S. Pat. No. 11,388,757, which is the 371 National Stage of International Application No. PCT/KR2019/005654, filed May 10, 2019, which claims priority to United Kingdom Patent Application No. GB1807680.2, filed on May 11, 2018, the disclosures of which are herein incorporated by reference in their entirety.

BACKGROUND

1. Field

The disclosure relates to wireless communication systems, and more particularly, to methods and apparatuses for performing a random access in non-terrestrial networks (NTNs).

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

Various services can be provided according to the development of a wireless communication system, and thus a method for easily providing such services is required.

Technical Solution

Provided are methods and apparatuses for performing a random access of a terminal in a wireless communication system. A method, performed by a terminal, of performing a random access, according to an embodiment, includes receiving preamble configuration information from a base station, obtaining a RACH (random access channel) preamble scaled in length in proportion to a difference between an expected minimum distance and an expected maximum distance to the base station from opposed edges of a cell served by the base station, based on the preamble configuration information and transmitting the obtained RACH preamble to the base station to access a NTN (non-terrestrial network).

DETAILED DESCRIPTION

Figure 1:
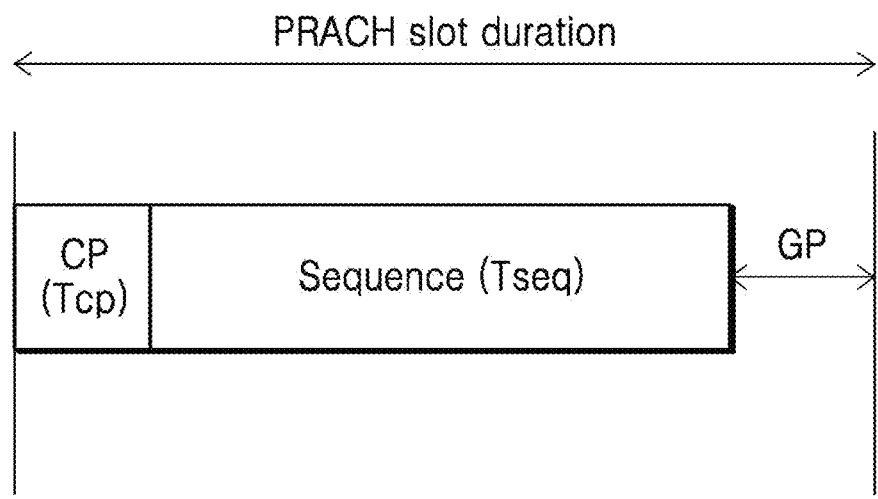
FIG. 1 shows a representation of an RA preamble.

The present application provides a method and an apparatus for performing a random access, which provides an effective random access mechanism for a NTN (non-terrestrial network.

To achieve the objective above, the present application adopts the following technical solutions: a method for performing a random access, by a terminal, comprising: receiving preamble configuration information from a base station; obtaining a RACH (random access channel) preamble scaled in length in proportion to a difference between an expected minimum distance and an expected maximum distance to the base station from opposed edges of a cell served by the base station, based on the preamble configuration information; and transmitting the obtained RACH preamble to the base station to access a NTN (non-terrestrial network).

Preferably, a length of the RACH preamble is rounded to a prime number higher than the scaled value.

Preferably, the RACH preamble further includes a cyclic prefix, CP, and a guard period, GP, and a duration of the CP and the GP are scaled in proportion to the difference between the expected minimum distance and the expected maximum distance to the base station from opposed edges of a cell served by the base station.

Preferably, the RACH preamble is transmitted repeatedly more than 4 times, repetition time is more than 20 ms, and a repetition rate is not less than 1 ms.

Preferably, a RACH pre-amble set is defined with offsets of an included ZC sequence to reflect the differential distances to the base station from opposed edges of a cell served by the base station.

Preferably, a duration of the RACH preamble is defined based on a variation in the expected minimum distance and the expected maximum distance, a speed of a light and a delay spread of fading channels.

In accordance with an aspect of the disclosure, a method for performing a random access, by a base station, comprising: determining at least one RACH preamble, for accessing a NTN (non-terrestrial network), scaled in length in proportion to a difference between an expected minimum distance and an expected maximum distance to the base station from opposed edges of a cell served by the base station; transmitting preamble configuration information regarding the at least one RACH preamble to a terminal; and receiving a RACH preamble generated according to the preamble configuration information, from the terminal.

In accordance with an aspect of the disclosure, a terminal for performing a random access, comprising: a processor configured to: receive preamble configuration information from a base station, obtain a RACH (random access channel) preamble scaled in length in proportion to a difference between an expected minimum distance and an expected maximum distance to the base station from opposed edges of a cell served by the base station, based on the preamble configuration information, and transmit the obtained RACH preamble to the base station to access a NTN (non-terrestrial network).

In accordance with an aspect of the disclosure, a base station for performing a random access, comprising: a transceiver and a processor configured to: determine at least one RACH preamble, for accessing a NTN (non-terrestrial network), scaled in length in proportion to a difference between an expected minimum distance and an expected maximum distance to the base station from opposed edges of a cell served by the base station, transmit preamble configuration information regarding the at least one RACH preamble to a terminal, and receive a RACH preamble generated according to the preamble configuration information, from the terminal.

Reference will now be made in detail to embodiments, examples of which are illustrated in the accompanying drawings, wherein like reference numerals refer to like elements throughout. In the following description, a detailed description of known functions and configurations incorporated herein will be omitted when it may make the subject matter of the embodiments unclear. The terms used herein are selected in consideration of functions obtained in accordance with the embodiments, and may be replaced by other terms based on intentions of one of ordinary skill in the art, customs, emergence of new technologies, or the like. Therefore, it is noted that the terms are construed based on the whole content of this specification. As used herein, the term "and/or" includes any and all combinations of one or more of the associated listed items. Expressions such as "at least one of," when preceding a list of elements, modify the entire list of elements and do not modify the individual elements of the list.

In prior art terrestrial telecommunication networks, cell size is limited and this cell size largely dictates the timing uncertainty when a User Equipment (UE) transmitting a random access (RA) request to a base station of the network. Therefore, the RA preamble design is based on the cell sizes (up to 100 km) in the prior art standards.

In NTNs, the base station may be a great distance from the UE and so the timing of RA requests is problematic.

In Fifth Generation (5G) or New Radio (NR) networks, NTNs may comprise satellite-based base stations (gNB) hundreds of kilometers from a UE hoping to connect. This distance means that previously used RA protocols are ineffective.

It is an aim of embodiments of the present invention to address issues with RA in NTNs.

In general, a UE is required to transmit a preamble to the gNB to initiate the random access procedure when the UE needs to establish uplink access to the network via the gNB. The preamble transmitted consists of a ZC (Zadoff-Chu) sequence potentially with repetition, cyclic prefix (CP) and guard period (GP) as shown in FIG. 1. This is all shown in the context of the PRACH slot duration, during which the RA preamble must be transmitted to be effective.

The length of each part of the preamble depends on multiple conditions, such as cell coverage, delay profile, etc. For example, the minimum CP length is given by the equation:

$$T_{CP} = \frac{2D}{c} + \sigma_{DS}$$

where D refers to propagation distance between the gNB and UE, c is the speed of light and $\sigma_{DS}$ represents the delay spread of fading channels.

In NR systems, the format of the RA preamble is designed according to the following tables.

Random access preamble format is designed in the following tables. The Table number refers to the corresponding table in the applicable standard document.

LRA refers to the length of the RA preamble sequence. $\Delta f^{RA}$ is a subcarrier spacing for the preamble sequence. The fourth column is the number of preamble sequence samples. The fifth column is the number of CP samples. The last column is the restricted sets type. Shorter preambles are usually used in small cells and longer preambles are usually used in large cells. They are broadcast by the base station.

TABLE 6.3.3.1-1

PRACH preamble formats for $L_{RA} = 839$ and $\Delta f^{RA} \in \{1.25, 5\}$ kHz

| Format | $L_{RA}$ | $\Delta f^{RA}$ | $N_u$ | $N_{CP}^{RA}$ | Support for restricted sets |
|---|---|---|---|---|---|
| 0 | 839 | 1.25 kHz | 24576κ | 3168κ | Type A, Type B |
| 1 | 839 | 1.25 kHz | 2 · 24576κ | 21024κ | Type A, Type B |
| 2 | 839 | 1.25 kHz | 4 · 24576κ | 4688κ | Type A, Type B |
| 3 | 839 | 5 kHz | 4 · 6144κ | 3168κ | Type A, Type B |

TABLE 6.3.3.1-2

Preamble formats for $L_{RA} = 139$ and $\Delta f^{RA} = 15 \cdot 2^\mu$ kHz where $\mu \in \{0, 1, 2, 3\}$

| Format | $L_{RA}$ | $\Delta f^{RA}$ | $N_u$ | $N_{CP}^{RA}$ | Support for restricted sets |
|---|---|---|---|---|---|
| A1 | 139 | $15 \cdot 2^\mu$ kHz | $2 \cdot 2048\kappa \cdot 2^{-\mu}$ | $288\kappa \cdot 2^{-\mu}$ | — |
| A2 | 139 | $15 \cdot 2^\mu$ kHz | $4 \cdot 2048\kappa \cdot 2^{-\mu}$ | $576\kappa \cdot 2^{-\mu}$ | — |
| A3 | 139 | $15 \cdot 2^\mu$ kHz | $6 \cdot 2048\kappa \cdot 2^{-\mu}$ | $864\kappa \cdot 2^{-\mu}$ | — |
| B1 | 139 | $15 \cdot 2^\mu$ kHz | $2 \cdot 2048\kappa \cdot 2^{-\mu}$ | $216\kappa \cdot 2^{-\mu}$ | — |
| B2 | 139 | $15 \cdot 2^\mu$ kHz | $4 \cdot 2048\kappa \cdot 2^{-\mu}$ | $360\kappa \cdot 2^{-\mu}$ | — |
| B3 | 139 | $15 \cdot 2^\mu$ kHz | $6 \cdot 2048\kappa \cdot 2^{-\mu}$ | $504\kappa \cdot 2^{-\mu}$ | — |
| B4 | 139 | $15 \cdot 2^\mu$ kHz | $12 \cdot 2048\kappa \cdot 2^{-\mu}$ | $936\kappa \cdot 2^{-\mu}$ | — |
| C0 | 139 | $15 \cdot 2^\mu$ kHz | $2048\kappa \cdot 2^{-\mu}$ | $1240\kappa \cdot 2^{-\mu}$ | — |
| C2 | 139 | $15 \cdot 2^\mu$ kHz | $4 \cdot 2048\kappa \cdot 2^{-\mu}$ | $2048\kappa \cdot 2^{-\mu}$ | — |

The cell coverage is limited by the CP length of the preamble sequence. For the above two tables, the path profile and cell coverage can be approximated respectively as in the following two tables, in which the format column in each case tallies with the respective tables above. "Path profile assumption" refers to the delay spread in the channel.

TABLE 1

| Format | Path profile assumption | Cell coverage (limited by CP length) |
|---|---|---|
| 0 | 4.69 μs | 15 km |
| 1 | 4.69 μs | 102 km |
| 2 | 4.69 μs | 22 km |
| 3 | 4.69 μs | 15 km |

TABLE 2

| Format | Path profile assumption | Max cell coverage (limited by CP length) |
|---|---|---|
| | 1.56 μs | 0.5 km |
| A1 | 3.13 μs | 0.9 km |
| A2 | 4.69 μs | 2.1 km |
| A3 | 4.69 μs | 3.5 km |
| B1 | 3.13 μs | 0.4 km |
| B2 | 4.69 μs | 1.1 km |
| B3 | 4.69 μs | 1.8 km |
| B4 | 4.69 μs | 3.9 km |
| C0 | 4.69 μs | 5.4 km |
| C2 | 4.69 μs | 9.3 km |

For NTN systems using a satellite, the propagation delay could be up to a few hundred milliseconds and, if CP length is based on propagation delay, this could be extremely long and the resulting overhead could be unacceptably high.

Figure 2:
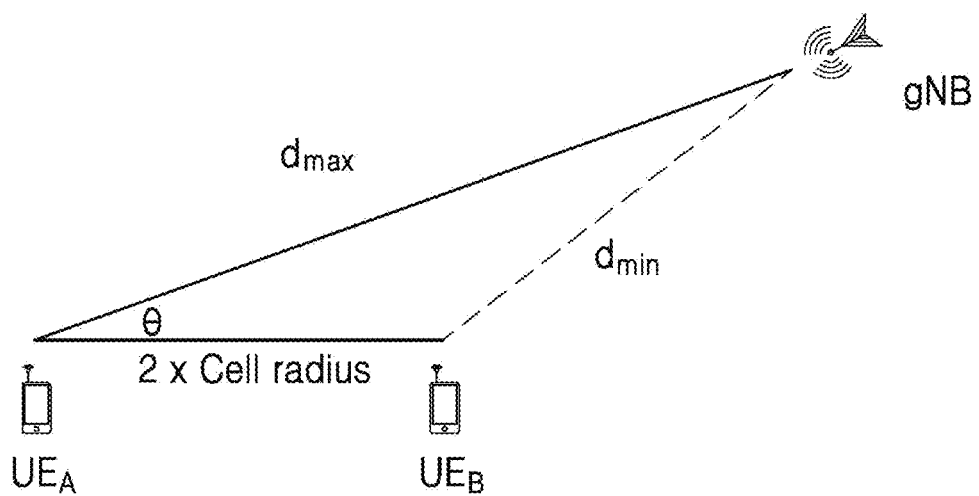
FIG. 2 shows a representation of a satellite-based NTN system according to an embodiment of the invention.

The lower bound for Tseq must allow for unambiguous round-trip time estimation for a UE located at the edge of the largest expected cell, including the maximum delay spread expected in such large cells. Hence:

$$T_{seq} \geq \frac{2D_{cell}}{c} + \sigma_{DS}$$

where Dcell is the cell radius, defined as the distance between UEA and UEB, shown in FIG. 2. However, for NTN system, the base station is not on the ground as shown in FIG. 2 and so the maximum distance from UE to gNB is significantly more than a notional 2× cell radius.

In FIG. 2, there are two UEs shown—UEA and UEB—located at opposite extreme edges of the cell. As such, the maximum distance from one UE served by the cell is related to UEA. The minimum distance from one UE served by the cell is related to UEB.

To address this issue, the above equation requires amending. Dcell is replaced by a term related to dmax which is illustrated in FIG. 2. Considering the aforementioned extremely large delay, Tseq could be very long and cause unacceptably high signaling overhead for random access.

Therefore, the above equation is amended to use the variation of the propagation delay between expected minimum and maximum values, rather than the absolute propagation delay itself. Therefore, the resultant equation is:

$$T_{seq} \geq \frac{d_{max} - d_{min}}{c} + \sigma_{DS}$$

In this case, the difference, dmax−dmin, depends on elevation angles as shown in the following table, Table 3, where Θ is the elevation angle to the satellite, as shown in FIG. 2, cell radius is the notional cell radius in km and dmax−dmin is the variation in the path in km.

TABLE 3

| Θ [degree] | Cell radius [km] | $d_{max}$-$d_{min}$ [km] |
|---|---|---|
| 10 | 200 | 390 |
| 20 | 200 | 372 |
| 30 | 200 | 343 |
| 40 | 200 | 303 |
| 50 | 200 | 254 |
| 60 | 200 | 197 |
| 70 | 200 | 134 |
| 80 | 200 | 67 |

As the satellite moves relative to the earth's surface and, as per the altitude of the particular satellite (LEO, MEO, GEO), the angle Θ changes and so dmax−dmin changes accordingly, as shown in Table 3.

Considering the worst case (i.e. largest dmax−dmin) with dmax−dmin=390 km, Tseq could be longer than 1300 μs and the currently prevailing standard in NR for Tseq does not support this value.

Therefore, an embodiment of the present invention extends the sequence, thereby providing an LRA larger than 839, which is the maximum available in the prior art. LRA is scaled based on the ratio of (dmax−dmin) and the largest specified NR cell radius.

For example, if dmax−dmin=390 km and NR largest cell radius is 102 km, according to the current version of the standard, the scaling should be (390/(102×2))=1.91 times, and LRA should be larger than 1.91×LRA NR=1602. Considering that this value should be a prime number, LRA can be selected to be 1607, the next largest prime number higher than 1602.

Another issue is the link budget, due to the extended distances travelled in NTN scenarios. In NR, the preamble sequence can be repeated up to 4 times to improve the SINR by 6 dB. In NTN, since the transmission distance is extremely long, and considering the limited power of the UE, the preamble sequence may be repeated more times, e.g., 8, 16, or 32 times to achieve 9, 12 and 15 dB SINR enhancement, respectively, to help ensure a successful detection probability.

A related issue is how frequently the PRACH needs to be repeated in the physical UL channel for NTN. In LTE the PRACH can be repeated up to once in every sub-frame, with 1 ms repetition rate and up to 20 ms repetition rate. However, with fewer NTN users, longer CP and with more repetitions for operations in lower SINR, 1 ms or similar higher repetition rates of PRACH may not be necessary or applicable for NTN. Repetition times longer than 20 ms are needed to cater for lower SINR NTN operations. Thus a different set of PRACH repetition options are defined according to an embodiment of the invention.

Following the same reasoning as set out above in connection with Tseq, the duration of the CP and GP can also depend on the variation of the propagation delay. This leads to the following equations:

$$T_{CP} \geq \frac{d_{max} - d_{min}}{c} + \sigma_{DS}$$

$$T_{GP} \geq \frac{d_{max} - d_{min}}{c}$$

Therefore, TCP and TGP are also scaled based on the footprint of the cell, in the same way as Tseq.

Another issue is the design of ZC (Zadoff-Chu) sequences used in the RACH pre-ambles. Cyclic shifts of a ZC sequence are used to generate multiple preamble sequences for NR (as in the prior art LTE system) as specified in TS 38.211. The separations between these shifts should be larger than the uplink timing uncertainty caused by the propagation delay and delay spread. Using the differential delay (dmax–dmin) as in Table 3, the cyclic shifts in the ZC sequence should be larger for NTN cells resulting in fewer pre-ambles in a set than for NR and LTE.

There are a variety of different NTN link types and the drone-based and (High-altitude platform) HAP-based (upto 20 km altitude) communication links fit within the propagation delays (up to 66.67 μs) of ground-based NR communication links, which are designed to support up to 100 km cell ranges in extreme cases.

Consequently pre-amble design sets similar to those used in NR can be used for such NTN operations, by considering the propagation delay aspect.

However for HAPs and satellites with different orbit levels, such as Low Earth Orbit (LEO)—800 km, Medium Earth Orbit (MEO) and Geostationary Earth Orbit (GEO)—36000 km, the propagation delays are in the 2-120 ms range and so larger separations between the cyclic shifts of the ZC sequences are needed for pre-amble set design, considering the differential delays in Table 3. This can be classified as another pre-amble set (smaller than the current set of 64 pre-ambles per cell), to support the higher altitude NTN communications.

Embodiments of the present invention therefore use different RACH pre-amble sets for NTN satellite links, compared to those used for e.g. ground-based base stations.

The serving satellite gNB is aware of the differential in the maximum and minimum propagation delays (dmax–dmin) and thus informs the ground based UE which pre-amble set to use in the RA procedure.

One other area where embodiments of the invention are useful is in cases where the UE has to handover between cells operated by satellites of different altitudes, or other NTN platforms or between NTN and ground based (terrestrial) cells. A contention-free RACH process is implemented in handover for NR systems and such a handover involves a RACH preamble selection by the UE, which is prescribed by the gNB.

When the handover is a switch between any of the prescribed permutations, the destination cell in the handover selects the appropriate pre-amble set (including the dmax–dmin based sets for satellites) and informs the UE accordingly which set to use.

Embodiments of the present invention enable cell ranges in excess of 100 km to be supported with minimal changes to the underlying standard specification. NTN operations introduce new challenges and opportunities and embodiments of the present invention provide solutions to problems encountered in this area, by modifying the RACH preamble.

Figure 3:
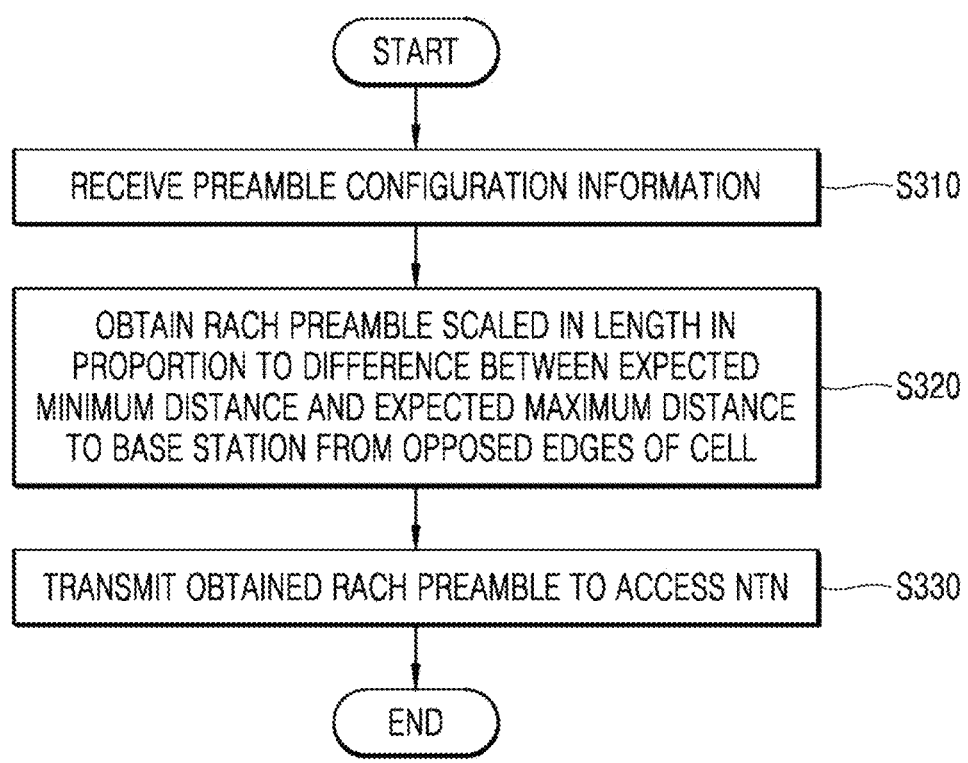
FIG. 3 is a flowchart of a method, performed by a terminal, of performing a random access, according to an embodiment of the present disclosure.

FIG. 3 is a flowchart of a method, performed by a terminal, of performing a random access, according to an embodiment of the present disclosure.

In operation S310, the terminal receives preamble configuration information from a base station. Herein, preamble configuration information includes information for a sequence for a RACH preamble, repetition time, a repetition rate and a number of the repetition of the RACH preamble.

In operation S320, the terminal obtains the RACH preamble scaled in length in proportion to a difference between an expected minimum distance and an expected maximum distance to the base station from opposed edges of a cell served by the base station, based on the preamble configuration information.

In operation S330, the terminal transmits the obtained RACH preamble to the base station to access a NTN (non-terrestrial network).

Figure 4:
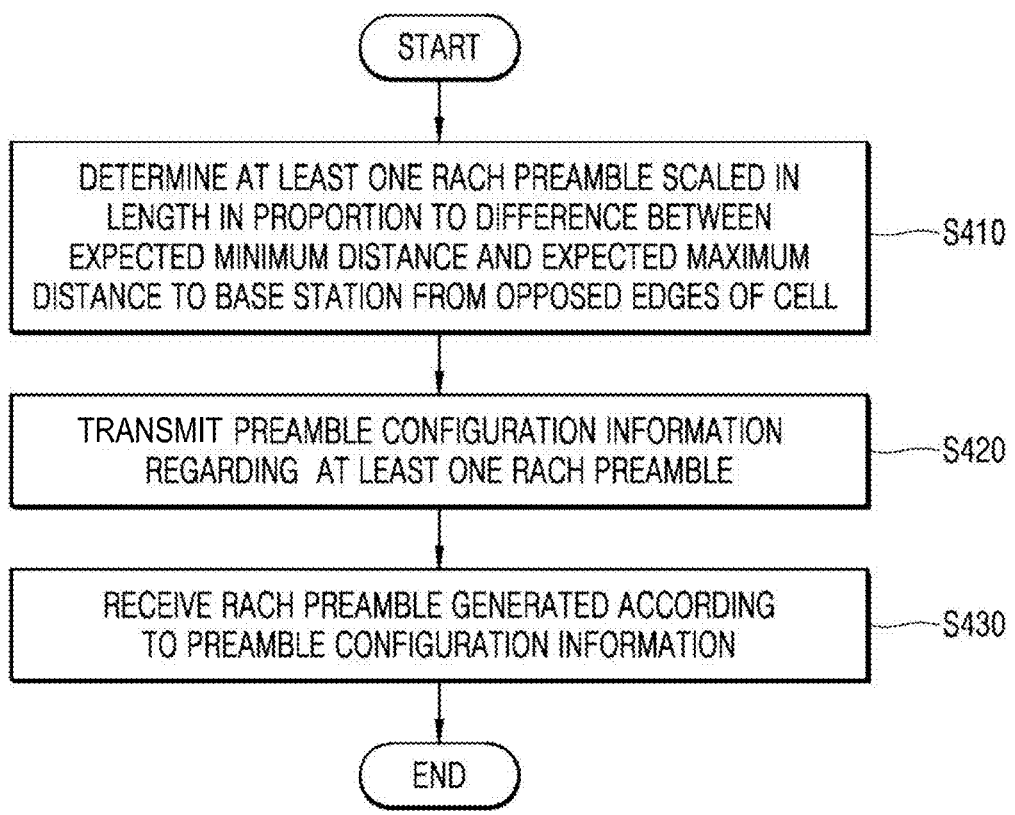
FIG. 4 is a flowchart of a method, performed by a base station, of performing a random access, according to an embodiment of the present disclosure.

FIG. 4 is a flowchart of a method, performed by a base station, of performing a random access, according to an embodiment of the present disclosure.

In operation S410, the base station determines at least one RACH preamble, for accessing a NTN, scaled in length in proportion to a difference between an expected minimum distance and an expected maximum distance to the base station from opposed edges of a cell served by the base station.

In operation S420, the base station transmits preamble configuration information regarding the at least one RACH preamble to a terminal.

In operation S430, the base station receives a RACH preamble generated according to the preamble configuration information, from the terminal.

Figure 5:
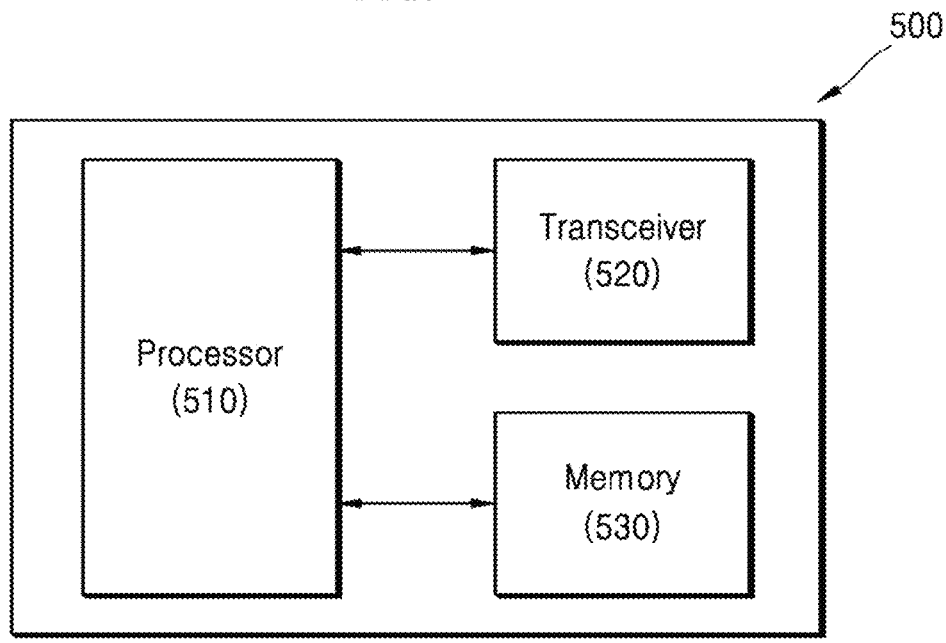
FIG. 5 is a diagram illustrating a terminal according to another embodiment of the present disclosure.

FIG. 5 is a diagram illustrating a terminal 500 according to another embodiment of the present disclosure.

Referring to the FIG. 5, the terminal 500 may include a processor 510, a transceiver 520 and a memory 530. However, all of the illustrated components are not essential. The terminal 500 may be implemented by more or less components than those illustrated in FIG. 5. In addition, the processor 510 and the transceiver 520 and the memory 530 may be implemented as a single chip according to another embodiment.

The aforementioned components will now be described in detail.

The processor 510 may include one or more processors or other processing devices that control the proposed function, process, and/or method. Operation of the terminal 500 may be implemented by the processor 510.

The processor 510 may control the transceiver 520 to receive preamble configuration information from a base station. The processor 510 may obtain a RACH (random access channel) preamble scaled in length in proportion to a difference between an expected minimum distance and an expected maximum distance to the base station from opposed edges of a cell served by the base station, based on the preamble configuration information. The processor 510 may control the transceiver 520 to transmit the obtained RACH preamble to the base station to access a NTN (non-terrestrial network).

The transceiver 520 may include a RF transmitter for up-converting and amplifying a transmitted signal, and a RF receiver for down-converting a frequency of a received signal. However, according to another embodiment, the transceiver 520 may be implemented by more or less components than those illustrated in components.

The transceiver 520 may be connected to the processor 510 and transmit and/or receive a signal. The signal may include control information and data. In addition, the transceiver 520 may receive the signal through a wireless channel and output the signal to the processor 510. The transceiver 520 may transmit a signal output from the processor 510 through the wireless channel.

The memory 530 may store the control information or the data included in a signal obtained by the terminal 500. The memory 530 may be connected to the processor 510 and store at least one instruction or a protocol or a parameter for the proposed function, process, and/or method. The memory 530 may include read-only memory (ROM) and/or random access memory (RAM) and/or hard disk and/or CD-ROM and/or DVD and/or other storage devices.

Figure 6:
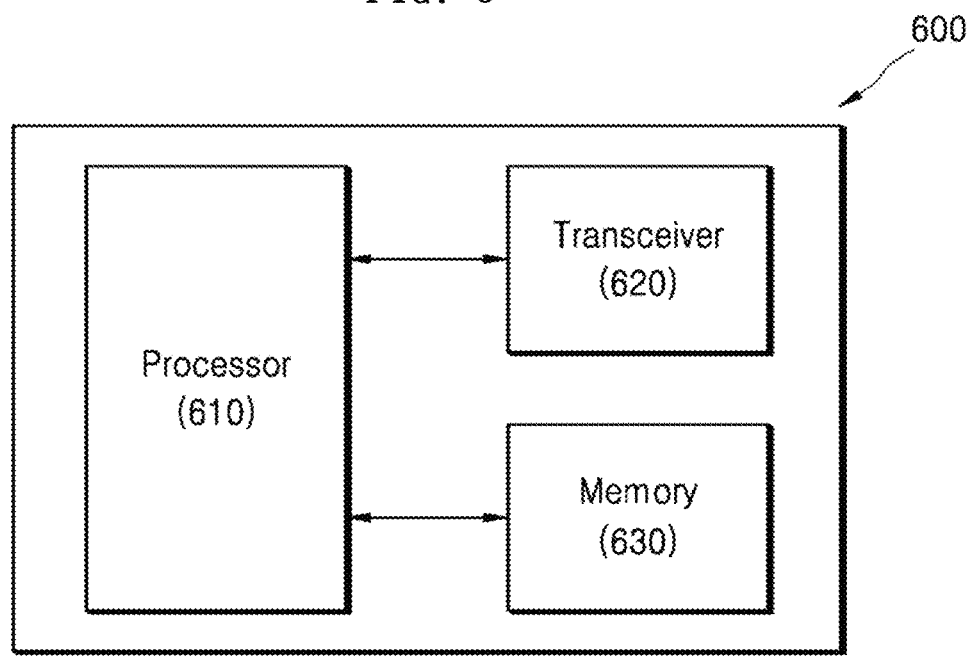
FIG. 6 is a diagram illustrating a base station according to another embodiment of the present disclosure.

FIG. 6 is a diagram illustrating a base station 600 according to another embodiment of the present disclosure.

Referring to the FIG. 6, the base station 600 may include a processor 610, a transceiver 620 and a memory 630. However, all of the illustrated components are not essential. The terminal 600 may be implemented by more or less components than those illustrated in FIG. 6. In addition, the processor 610 and the transceiver 620 and the memory 630 may be implemented as a single chip according to another embodiment.

The aforementioned components will now be described in detail.

The processor 610 may include one or more processors or other processing devices that control the proposed function, process, and/or method. Operation of the base station 600 may be implemented by the processor 610.

The processor 610 may determine at least one RACH preamble, for accessing a NTN (non-terrestrial network), scaled in length in proportion to a difference between an expected minimum distance and an expected maximum distance to the base station from opposed edges of a cell served by the base station. The processor 610 control the transceiver 620 to transmit preamble configuration information regarding the at least one RACH preamble to a terminal and to receive a RACH preamble generated according to the preamble configuration information, from the terminal.

The transceiver 620 may include a RF transmitter for up-converting and amplifying a transmitted signal, and a RF receiver for down-converting a frequency of a received signal. However, according to another embodiment, the transceiver 620 may be implemented by more or less components than those illustrated in components.

The transceiver 620 may be connected to the processor 610 and transmit and/or receive a signal. The signal may include control information and data. In addition, the transceiver 620 may receive the signal through a wireless channel and output the signal to the processor 610. The transceiver 620 may transmit a signal output from the processor 610 through the wireless channel.

The memory 630 may store the control information or the data included in a signal obtained by the base station 600. The memory 630 may be connected to the processor 610 and store at least one instruction or a protocol or a parameter for the proposed function, process, and/or method. The memory 1030 may include read-only memory (ROM) and/or random access memory (RAM) and/or hard disk and/or CD-ROM and/or DVD and/or other storage devices. At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method performed by a base station in a wireless communication system, the method comprising:
   transmitting, to a terminal, configuration information associated with a length of a random access preamble sequence (LRA), the LRA being greater than 839; and
   receiving, from the terminal, a preamble, wherein the preamble is generated based on the configuration information associated with the LRA.

2. The method of claim 1, further comprising:
   identifying a differential delay between a first position and a second position; and
   determining the LRA, based on the differential delay.

3. The method of claim 2, wherein the differential delay indicates a difference between a first distance from the first position to the base station and a second distance from the second position to the base station, and
   wherein the first position and the second position correspond to a first edge of a cell and a second edge of the cell, respectively.

4. The method of claim 2, wherein the LRA is extended based on the differential delay.

5. The method of claim 2, wherein the base station comprises a satellite in a non-terrestrial network (NTN) system, and
   wherein the differential delay is determined by an elevation angle of the satellite.

6. The method of claim 1, further comprising:
   determining a random access preamble format indicating the LRA.

7. The method of claim 6, wherein a length of a cyclic prefix is identified based on the random access preamble format.

8. A method performed by a terminal in a wireless communication system, the method comprising:
   receiving, from a base station, configuration information associated with a length of a random access preamble sequence (LRA), the LRA being greater than 839;
   identifying a preamble, based on the configuration information associated with the LRA; and
   transmitting to the base station, the identified preamble.

9. The method of claim 8, wherein the LRA is determined based on a differential delay between a first position and a second position.

10. The method of claim 9, wherein the differential delay indicates a difference between a first distance from the first position to the base station and a second distance from the second position to the base station, and
    wherein the first position and the second position correspond to a first edge of a cell and a second edge of the cell, respectively.

11. The method of claim 9, wherein the LRA is extended based on the differential delay.

12. The method of claim 9, wherein the base station comprises a satellite in a non-terrestrial network (NTN) system, and
    wherein the differential delay is determined by an elevation angle of the satellite.

13. The method of claim 8, wherein a random access preamble format indicating the LRA is determined.

14. The method of claim 13, further comprising:
    identifying a length of a cyclic prefix based on the random access preamble format.

15. A base station in a wireless communication system, the base station comprising:
    a transceiver; and
    at least one processor configured to:
    transmit, to a terminal via the transceiver, configuration information associated with a length of a random access preamble sequence (LRA), the LRA being greater than 839; and
    receive, from the terminal via the transceiver, a preamble, wherein the preamble is generated based on the configuration information associated with the LRA.

* * * * *